United States Patent
Kang et al.

(10) Patent No.: US 8,621,266 B2
(45) Date of Patent: Dec. 31, 2013

(54) NONVOLATILE MEMORY SYSTEM AND RELATED METHOD OF PERFORMING ERASE REFRESH OPERATION

(75) Inventors: Sang chul Kang, Hwaseong-si (KR); Seung hyun Han, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 406 days.

(21) Appl. No.: 12/842,344

(22) Filed: Jul. 23, 2010

(65) Prior Publication Data

US 2011/0066899 A1  Mar. 17, 2011

(30) Foreign Application Priority Data

Sep. 17, 2009  (KR) .......................... 10-2009-0088183

(51) Int. Cl.
*G06F 11/00* (2006.01)

(52) U.S. Cl.
USPC .......... 714/6.11; 714/6.1; 714/6.13; 714/763; 714/764

(58) Field of Classification Search
USPC .......................... 714/6.1, 6.11, 6.13, 763, 764
See application file for complete search history.

(56) References Cited

U.S. PATENT DOCUMENTS

| | | | |
|---|---|---|---|
| 6,014,755 A * | 1/2000 | Wells et al. | 714/6.13 |
| 6,684,344 B1 * | 1/2004 | Kawasaki | 714/6.13 |
| 7,839,685 B2 * | 11/2010 | Auclair et al. | 365/185.09 |
| 7,881,116 B2 * | 2/2011 | Nagashima et al. | 365/185.19 |
| 7,954,004 B2 * | 5/2011 | Li | 714/6.13 |
| 7,954,037 B2 * | 5/2011 | Lasser et al. | 714/763 |
| 7,990,764 B2 * | 8/2011 | Alrod et al. | 365/185.02 |
| 8,072,805 B2 * | 12/2011 | Chou et al. | 365/185.03 |
| 8,122,329 B2 * | 2/2012 | Kong et al. | 714/785 |
| 8,127,202 B2 * | 2/2012 | Cornwell et al. | 714/764 |
| 8,130,544 B2 * | 3/2012 | Chou et al. | 365/185.03 |
| 8,145,984 B2 * | 3/2012 | Sommer et al. | 714/797 |
| 8,156,398 B2 * | 4/2012 | Sommer | 714/752 |
| 8,214,729 B2 * | 7/2012 | Benoit et al. | 714/801 |
| 8,259,506 B1 * | 9/2012 | Sommer et al. | 365/185.24 |
| 8,291,295 B2 * | 10/2012 | Harari et al. | 714/763 |
| 8,356,231 B2 * | 1/2013 | Cornwell et al. | 714/764 |
| 2005/0083726 A1 * | 4/2005 | Auclair et al. | 365/154 |
| 2006/0156189 A1 * | 7/2006 | Tomlin | 714/763 |
| 2007/0091677 A1 * | 4/2007 | Lasser et al. | 365/185.09 |
| 2007/0201274 A1 * | 8/2007 | Yu et al. | 365/185.09 |
| 2008/0219053 A1 * | 9/2008 | Kim | 365/185.11 |
| 2008/0307270 A1 * | 12/2008 | Li | 714/47 |
| 2009/0049364 A1 * | 2/2009 | Jo et al. | 714/763 |
| 2009/0144600 A1 * | 6/2009 | Perlmutter et al. | 714/763 |
| 2009/0177932 A1 * | 7/2009 | Abts et al. | 714/704 |
| 2009/0187785 A1 * | 7/2009 | Gonzalez et al. | 714/5 |
| 2009/0199074 A1 * | 8/2009 | Sommer | 714/763 |

(Continued)

FOREIGN PATENT DOCUMENTS

| | | |
|---|---|---|
| EP | 1959345 A1 | 8/2008 |
| KR | 1020070019575 A | 2/2007 |
| KR | 1020080059461 A | 6/2008 |

*Primary Examiner* — Joshua P Lottich
(74) *Attorney, Agent, or Firm* — Volentine & Whitt, PLLC

(57) ABSTRACT

A memory system comprises a flash memory and a memory controller. The flash memory comprises a plurality of memory blocks. The memory controller performs a read retry operation on a memory block containing an uncorrectable read error until an accurate data value is read from the memory block. The memory controller then controls the flash memory to perform an erase refresh operation on the memory block.

17 Claims, 11 Drawing Sheets

(56) References Cited

U.S. PATENT DOCUMENTS

| | | | |
|---|---|---|---|
| 2009/0292971 A1* | 11/2009 | Man et al. | 714/763 |
| 2010/0020616 A1* | 1/2010 | Auclair et al. | 365/185.18 |
| 2011/0038205 A1* | 2/2011 | Chou et al. | 365/185.03 |
| 2011/0225472 A1* | 9/2011 | Sommer et al. | 714/719 |
| 2011/0231740 A1* | 9/2011 | Lasser et al. | 714/773 |
| 2012/0254696 A1* | 10/2012 | Perlmutter et al. | 714/763 |
| 2012/0297270 A1* | 11/2012 | Shalvi et al. | 714/763 |

* cited by examiner

NONVOLATILE MEMORY SYSTEM AND RELATED METHOD OF PERFORMING ERASE REFRESH OPERATION

CROSS-REFERENCE TO RELATED APPLICATIONS

This application claims priority under 35 U.S.C. §119 to Korean Patent Application No. 10-2009-0088183 filed on Sep. 17, 2009, the disclosure of which is hereby incorporated by reference in its entirety.

BACKGROUND

Embodiments of the inventive concept relate generally to semiconductor memory devices. More particularly, embodiments of the inventive concept relate to systems, devices, and methods for correcting and preventing the read errors in nonvolatile memory devices.

Semiconductor memory devices can be roughly divided into two categories based on whether they retain stored data when disconnected from power. These categories include volatile memory devices, which lose stored data when disconnected from power, and nonvolatile memory devices, which retain stored data when disconnected from power. Because nonvolatile memory devices retain stored data when disconnected from power, they are often used to store data that must be retained even when devices are powered down.

Examples of volatile memory devices include dynamic random access memory (DRAM) and static random access memory (SRAM). Examples of nonvolatile memory devices include electrically erasable programmable read only memory (EEPROM), ferroelectric random access memory (FRAM), phase-change random access memory (PRAM), magnetoresistive random access memory (MRAM), and flash memory.

Flash memory is among the more popular forms of nonvolatile memory due to its relatively high storage capacity, performance, and reliability. Flash memory can currently be found in a wide variety of consumer and industrial devices, such as such as cameras, cell phones, netbooks, portable memory cards, home electronics, network devices, and embedded controllers, to name but a few.

One of the current limitations flash memory is that it tends to wear out after a certain number of program/erase operations. This wearing out typically occurs on a block-by-block basis because flash memory cells are erased a block at a time. A block of flash memory typically wears out through breakdown of oxide layers that separate floating gates from channel regions of memory cells. The breakdown of these oxide layers reduces the memory cells' ability to retain stored charge, which can lead to decreased read margins and read errors in the memory cells.

SUMMARY

Selected embodiments of the inventive concept provide devices and methods that can correct and prevent read errors. Selected embodiments also provide devices and methods for preventing bad blocks from occurring. Selected embodiments also provide devices and methods for enhancing the reliability of data. Selected embodiments also provide devices and methods for enhancing the read speed and read performance of flash memories.

According to one embodiment of the inventive concept, a flash memory system comprises a flash memory comprising a plurality of memory blocks, and a memory controller. The memory controller repeatedly performs a read retry operation on a memory block in which an uncorrectable read error has been detected, until an accurate data value is read, and thereafter controls the flash memory to perform an erase refresh operation on the memory block.

In certain embodiments, the flash memory stores and updates read retry information associated with the read retry operation each time the read retry operation is performed.

In certain embodiments, the read retry information is stored in a memory cell array or register of the flash memory.

In certain embodiments, the read retry information comprises at least one of (a) a number of times the read retry operation has been performed on the memory block, (b) an address of the memory block, and (c) a variable read voltage used to read accurate data in the read retry operation.

In certain embodiments, the memory controller controls the erase refresh operation based on the read retry information.

In certain embodiments, the memory controller controls the erase refresh operation based on erasing/programming cycle information of the memory block.

In certain embodiments, the read retry operation is performed multiple times with different read voltages until the accurate data value is read.

In certain embodiments, the different read voltages are produced by incrementing a normal read voltage in successive read retry operations.

In certain embodiments, the different read voltages are produced by decreasing a normal read voltage in successive read retry operations.

According to another embodiment of the inventive concept, a method of operating a memory device comprising a plurality of memory blocks is provided. The method comprises repeatedly performing a read retry operation on a memory block in which an uncorrectable read error has been detected, until an accurate data value is read from the memory block, and performing an erase refresh operation on the memory block after the read retry operation has been performed at least one time, in response to read retry information associated with the read retry operation.

In certain embodiments, the read retry operation is performed multiple-times using different read voltages until the accurate data value is read.

In certain embodiments, the different variable read voltages are produced by decreasing a normal read voltage by a predetermined amount in successive read retry operations.

In certain embodiments, the different read voltages are produced by incrementing a normal read voltage by a predetermined amount in successive read retry operations.

In certain embodiments, the read retry information comprises at least one of (a) a number of times the read retry operation has been performed on the memory block, (b) an address of the memory block, and (c) a variable read voltage which is used to read accurate data in the read retry operation.

According to still another embodiment of the inventive concept, a method of operating a nonvolatile memory device comprising a plurality of memory blocks is provided. The method comprises reading data from a selected memory block, detecting whether an uncorrectable error exists in the data, upon detecting the uncorrectable error, performing a plurality of read retry operations on the selected memory block using a plurality of variable read voltages, until the data is accurately read, and moving the data that has been accurately read to a free memory block and erasing the selected memory block.

In certain embodiments, the method further comprises marking the selected memory block as an invalid block or a bad block upon detecting that a number of erasing/programming cycles of the selected memory block is greater than or equal to a predetermined reference value.

In certain embodiments, reading the data from the selected memory block comprises determining whether a prior read retry operation has accurately read data from the selected memory block, upon determining that a prior read retry operation has accurately read data from the selected memory block, applying a variable read voltage from the prior read retry operation to the selected memory block, and upon determining that no prior read retry operation has accurately read data from the selected memory block, applying a normal read voltage to the selected memory block.

In certain embodiments, the selected memory block is a memory block where a read retry operation has been performed in at least one prior instance to accurately read the data.

In certain embodiments, the different read voltages are produced by decreasing a normal read voltage by a predetermined amount in successive read retry operations.

In certain embodiments, the different read voltages are produced by increasing a normal read voltage by a predetermined amount in successive read retry operations.

BRIEF DESCRIPTION OF THE DRAWINGS

The drawings illustrate various embodiments of the inventive concept. In the drawings, like reference numbers denote like features.

DETAILED DESCRIPTION OF EMBODIMENTS

Embodiments of the inventive concept are described below with reference to the accompanying drawings. These embodiments are presented as teaching examples and should not be interpreted to limit the scope of the inventive concept. For instance, certain embodiments are described in the context of flash memories having specific configurations, but the inventive concept is not limited to flash memories or the described configurations. Rather, the inventive concept can be embodied using flash memories with other configurations, such as NAND and NOR configurations, and the inventive concept can be embodied using alternative types of memories, such as MRAM and PRAM.

In certain embodiments, a flash memory device performs a read retry operation for a memory block that is detected to have uncorrectable errors in an error correction operation performed during a read operation. Information associated with the read retry operation (hereafter, "read retry information") is stored in a memory controller, and the flash memory device moves data stored in the memory block to a free memory block under the control of the memory controller. After data is moved, the memory block is erased.

The operation that moves the data from the memory block to the free memory block is referred to as a refresh operation, erase refresh operation, or read reclaim operation. In certain embodiments, an erase refresh operation is performed to eliminate future read retry operations, thus enhancing read speed and performance of a flash memory. The erase refresh operation can also correct and prevent read errors in the flash memory, and can prevent generation of bad blocks.

Figure 1:
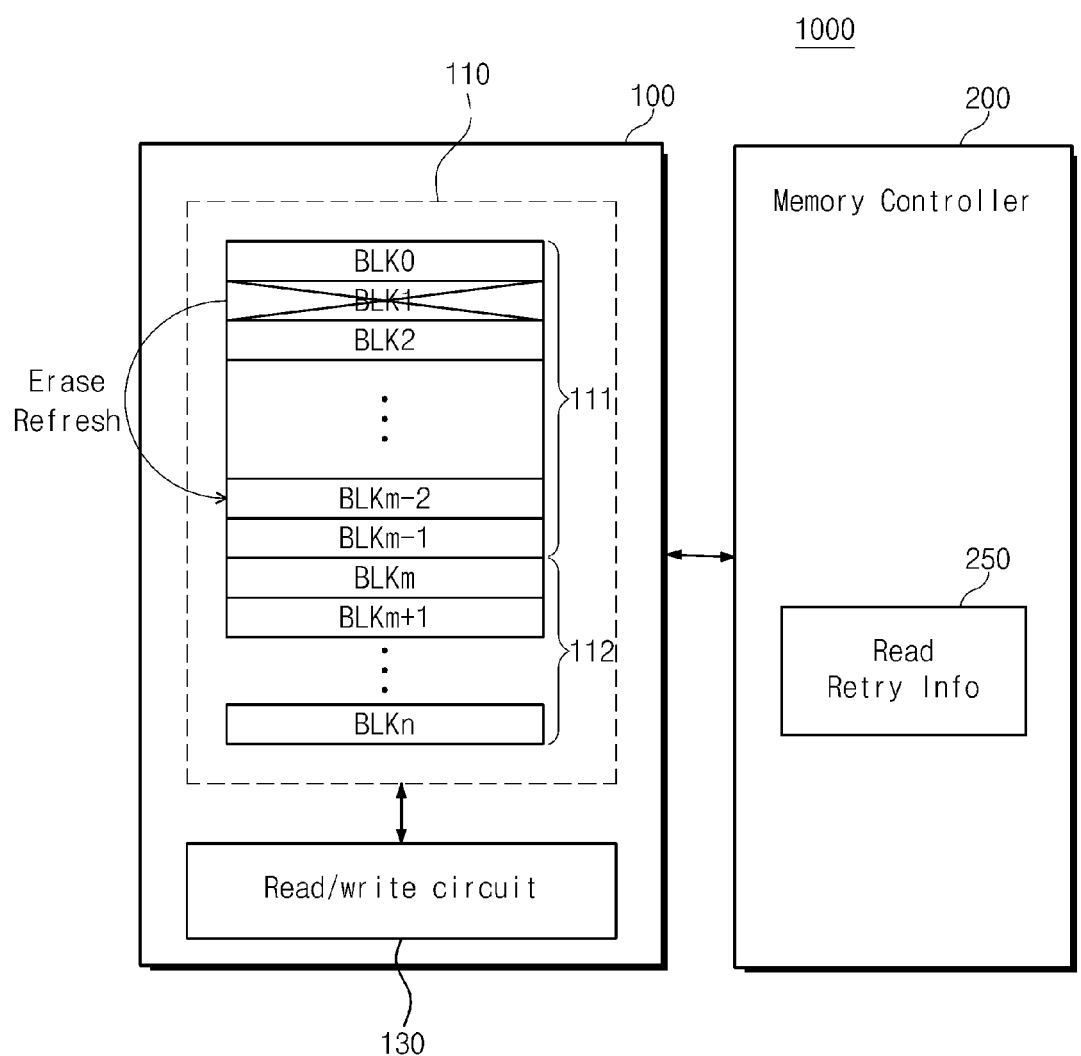
FIG. 1 is a block diagram of a memory system according to an embodiment of the inventive concept.

FIG. 1 is a block diagram of a memory system 1000 according to an embodiment of the inventive concept.

Referring to FIG. 1, memory system 1000 comprises a flash memory 100 and a memory controller 200.

Memory controller 200 controls read, write, and erase operations of flash memory 100 in response to requests from a host (not shown). Memory controller 200 typically provides an interface between the host and flash memory 100. Memory controller 200 typically controls operations of flash memory 100 through the use of firmware or software.

Flash memory 100 stores N-bit data that has been programmed under the control of memory controller 200. For example, flash memory 100 can store 1-bit data or 2-bit data in each memory cell. A memory cell that stores 1-bit data is called a single-bit memory cell or a single-level cell (SLC), and a memory cell storing multiple bits of data is called a multi-bit cell or a multi-level cell (MLC).

Flash memory 100 comprises a memory cell array 110 that is configured with a plurality of memory blocks BLK0 through BLKn divided into first and second regions 111 and 112. First and second regions 111 and 112 include blocks BLK0 through BLKm and BLK(m+1) through BLKn, respectively.

In certain embodiments, memory blocks BLK0 through BLKm of first region 111 are used to store main data and/or code data. First region 111 comprises spare memory blocks for block replacement and erase refresh operations. Memory blocks BLK(m+1) through BLKn of second region 112 store metadata for managing memory blocks. For example, second region 112 can store an address mapping table of a flash translation layer (FTL) and read retry information for the memory blocks of first region 111. However, this configuration is merely an example, and other schemes can be used to store read retry information in flash memory 100. For example, the read retry information can be stored in another data storage region of flash memory 100, such as a register, instead of second region 112.

The read retry information typically comprises a number of read-retry times representing how many times a read retry operation has been performed in a memory block or page selected for a read operation. Moreover, the read retry information can further comprise at least one of the address of a memory block or page in which read retry has been performed and a variable read voltage level that is used when reading accurate data during the read retry operation. The address of the memory block or page in which read retry operation has been performed can be stored and managed using the address mapping table of the FTL. The address of the memory block or page in which the read operation or read retry operation has been performed can be managed by memory controller 200. In this case, the address may not be managed separately from the read retry information in flash memory 100.

Memory blocks BLK0 through BLKm and BLK(m+1) to BLKn of the respective first and second regions 111 and 112 can be configured with a main region and a spare region. The main region can store main data input by a user, and the spare region can store information associated with the main data, such as flag information, ECC information, a device code, a maker code, page information and erasing/programming cycle (#P/E cycle) information.

Data stored in the spare region is not limited to a specific type of information, so it can be composed of various different types of information. A read and programming operation for the main region and spare region of first and second regions 111 and 112 can be performed by a read/write circuit 130 in flash memory 100. Read and programming operations performed by read/write circuit 130 will be described in further detail with reference to FIG. 5.

In certain embodiments, flash memory 100 has a NAND-type configuration. However, the inventive concept is not limited to NAND-type flash memories. In various alternative embodiments, for instance, flash memory 100 can comprise a NAND-type flash memory, a NOR flash memory, or a One-NAND flash memory in which a flash memory core and a memory controller are implemented in a single chip. Flash memory 100 can also have a hybrid configuration where at least two kinds of flash memories are combined.

The structure of the charge trapping layer of memory cells in flash memory 100 can be implemented in various forms. For example, the charge trapping layer of the memory cells can be configured with a conductive floating gate, and can be configured with a charge trapping layer such as $Si_3N_4$, $Al_2O_3$, HfAlO and HfSiO, and particularly, a layer having a charge trapping site. A flash memory structure using the layer as a charge trapping layer is called a charge trap flash (CTF) memory.

Figure 2:
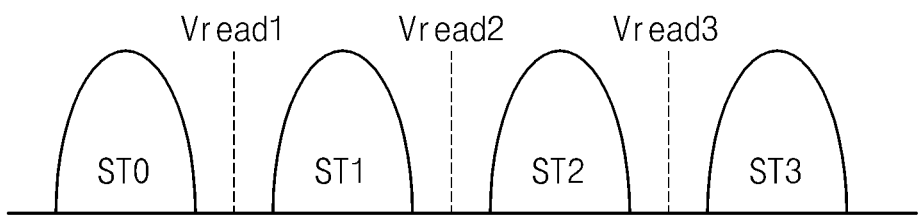
FIG. 2 is a graph illustrating threshold voltage distributions of memory cells in a flash memory of FIG. 1.
Figure 3:
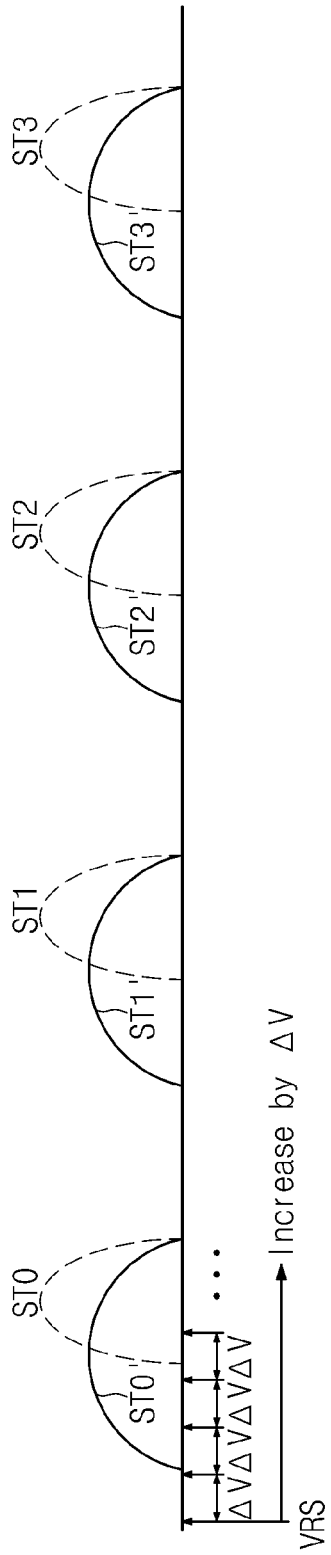
FIGS. 3 and 4 are graphs illustrating variations of the threshold voltage distributions of FIG. 2.
Figure 4:
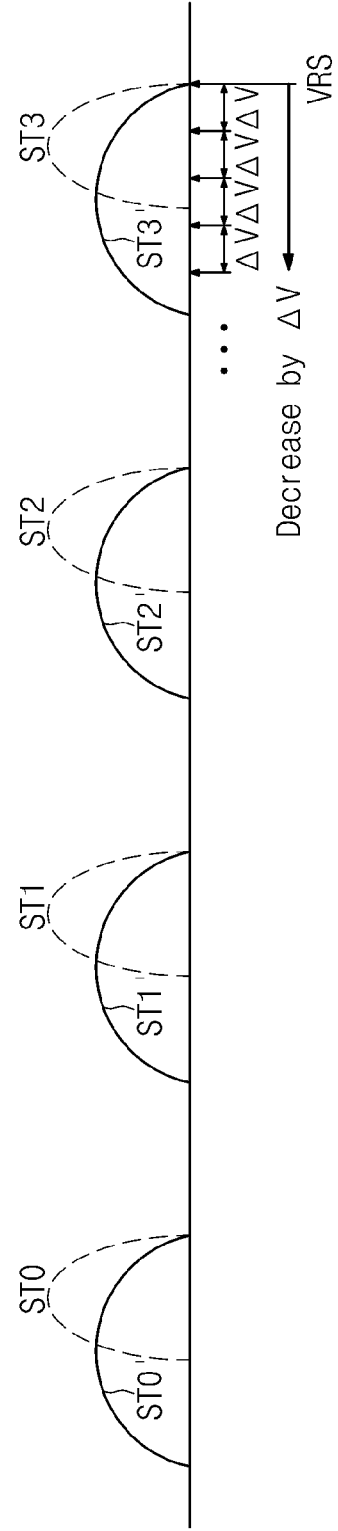

FIG. 2 is a graph illustrating threshold voltage distributions of memory cells in flash memory 100 of FIG. 1. FIGS. 3 and 4 are graphs illustrating variations of the threshold voltage distributions of FIG. 2. In particular, FIGS. 3 and 4 illustrate changes of the threshold voltage distributions due to hot temperature stress (HTS).

Referring to FIG. 2, where flash memory 100 comprises MLC cells storing 2-bit data, each memory cell can be programmed in any one of four data states ST0 through ST3. Data states ST0 through ST3 can be sensed by applying a plurality of read voltages Vread1 through Vread3. Unfortunately, however, the threshold voltage distributions of FIG. 2 can be change to undesired states due to various factors.

For example, the charge retention characteristics of a flash memory cell can be deteriorated because of charge diffusion, ion impurities, program disturbance, HTS and thermal ion emission due to defects of an interpoly dielectric. Consequently, as shown in FIGS. 3 and 4, the threshold voltage distributions of flash memory cells can change from states ST0 through ST3 into states ST0' to ST3'. In addition, the threshold voltage distributions of the flash memory cell can be changed by factors such as soft programming and over programming, which can shift the threshold voltages in ways different FIGS. 3 and 4. The above-described changes of threshold voltage distributions can decrease read margins of memory cells and cause read errors.

To correct the read errors, memory controller 200 can perform an error correction operation using error correction codes (ECCs). However, the error correction operation can only correct a certain number of errors in a unit of data being read. Accordingly, where the number of errors in a unit of data being read exceeds the number of correctable errors, memory controller 200 can control flash memory 100 to perform a read retry operation.

Referring to FIG. 3, a read retry operation may repeatedly perform a read operation until accurate data is read while increasing a read voltage by a voltage increase increment ($\Delta V$) from a start voltage VRS. In another embodiment, shown in FIG. 4, the read retry operation can repeatedly perform the read operation until accurate data is read while decreasing a read voltage by the voltage increase increment ($\Delta V$) from start voltage VRS. Data that is read with an accurate value through the read retry operation is provided to the host through memory controller 200.

In the above-described read retry operation, although a plurality of memory cells in a memory block have shifted threshold voltages, data can be accurately sensed with a varied read voltage. The read retry operation does not correct the changed threshold voltage distribution of a memory block, but can accurately sense data in spite of the changed threshold voltage distribution. Consequently, read retry operations may be performed repeatedly on some memory blocks.

To avoid repeating the read retry operation, read retry information can be stored in second region 112. The read retry information can then be provided to memory controller 200 to initiate an erase refresh operation.

Memory controller 200 stores read retry information provided from flash memory 100 in a data storage region 250. Memory controller 200 controls flash memory 100 so that the erase refresh operation is performed for the data of a block where read retry has been performed at least one time, on the basis of the read retry information.

In the erase refresh operation, the data of a block (for example, BLK1) where read retry has been performed may be moved to a clear memory block (for example, BLK(m-2)) or a reserved memory block that is provided to flash memory 100. Data is moved, and the block BLK1 in which read retry has been performed is erased.

In some embodiments, the erase refresh operation is performed each time the read retry operation is performed. In other embodiments, the erase refresh operation is performed for a memory block in which the read retry operation has been performed at least a certain number of times. In memory blocks where the retry operation has been performed less than a certain number of times, however, a varied read voltage, such as an incremented or decremented read voltage used in a prior read retry operation, can be used to read the selected memory cells without repeating all of the steps of the prior read retry operation. The varied read voltage can be indicated by the read retry information stored in the prior read retry operation.

The above-described erase refresh operation prevents repetition of read retry operations, which can improve overall read performance of flash memory 100. The erase refresh operation can also prevent read errors. In addition to performing erase refresh operations based on read retry operations, memory system 1000 can also perform erase refresh operations in consideration of erasing/programming cycle (#P/E cycle) information of a memory block where a read error has occurred.

Figure 5:
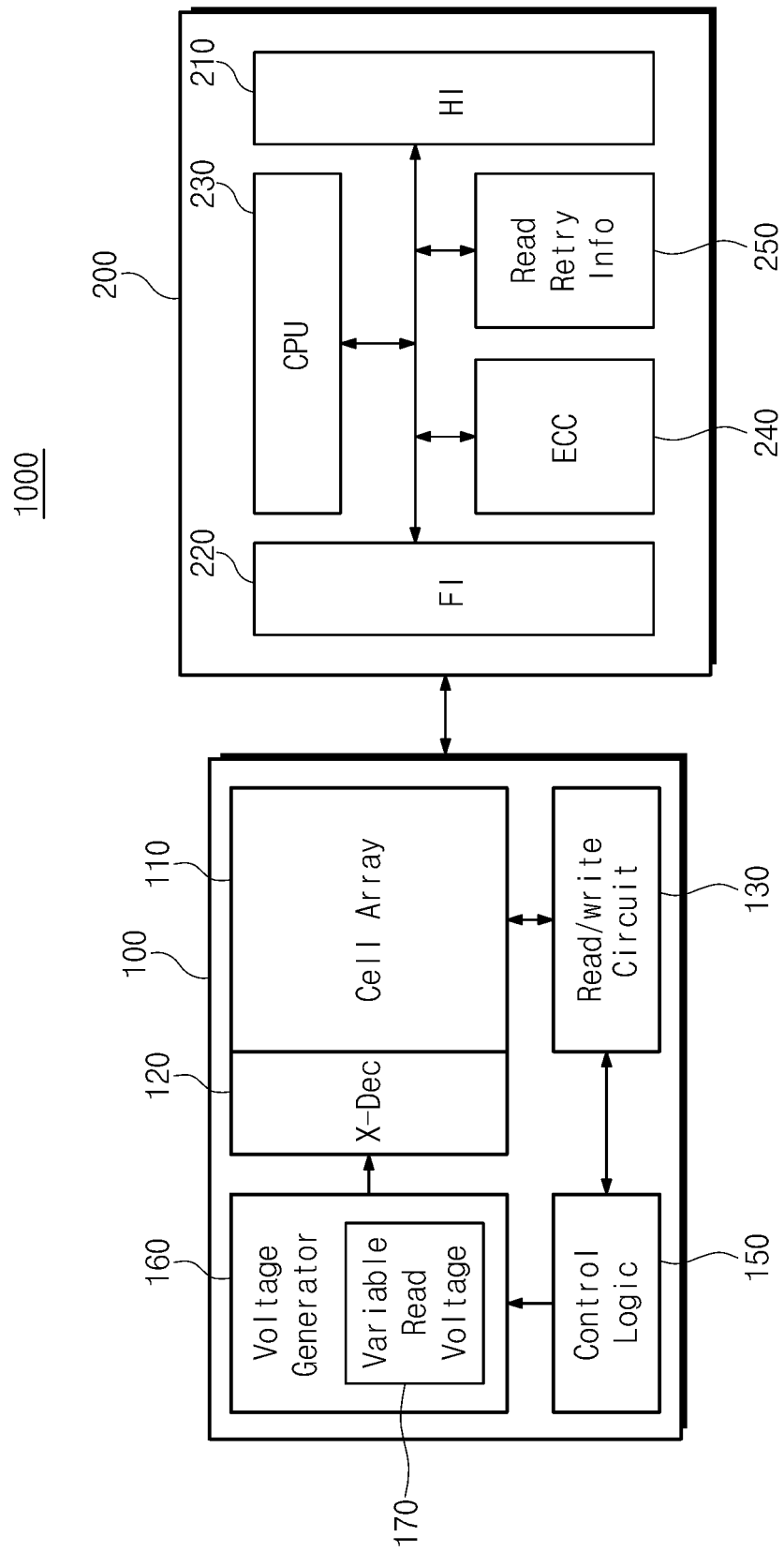
FIG. 5 is a block diagram illustrating an example configuration of a flash memory and controller in the memory system of FIG. 1.

FIG. 5 is a block diagram illustrating an example configuration of flash memory 100 and memory controller 200 of FIG. 1.

In the example of FIG. 5, flash memory 100 comprises a memory cell array 110, a decoding circuit 120, a read/write circuit 130, control logic 150, and a voltage generating circuit 160. Voltage generating circuit 160 comprises a variable read voltage generating unit 170.

As indicated in the description of FIG. 1, memory cell array 110 comprises a plurality of memory blocks BLK0 through BLKn. In the case of a NAND-type flash memory, programming and read operations are typically performed in page units, and erase operations are typically performed in block units comprising a plurality of pages. Each memory block typically comprises a plurality of NAND strings corresponding to a plurality of columns or bit lines. Each of the strings typically comprises a string selection transistor, a plurality of memory cells, and a ground selection transistor. Each of the memory cells is controlled by a voltage applied to a corresponding word line. Memory cells connected to a common word line can correspond one or more pages depending on the number of bits stored in each memory cell. For instance, a plurality of 2-bit memory cells connected to the same word line can store two pages of data. For explanation purposes, it will be assumed that first and second regions 111 and 112 comprise memory blocks having the NAND-type structure described above.

Control logic 150 controls decoding circuit 120, voltage generating circuit 160 and read/write circuit 130 according to an operation mode of flash memory 100, such as a programming operation mode, an erase operation mode, a normal read operation mode, a verification read operation mode, and a read retry operation mode.

Voltage generating circuit 160 generates word line voltages to be applied to respective word lines according to the operation mode, and a voltage to be applied to a bulk where memory cells are formed. The generated word line voltages can comprises, for instance, a program voltage Vpgm, a read voltage Vread, and a pass voltage Vpass. The voltage generating operation of voltage generating circuit 160 is performed under the control of control logic 150. Variable read voltage generating unit 170 is included in voltage generating circuit 160, and generates a plurality of variable read voltages to be used for read retry operations.

Decoding circuit 120 selects one of the memory blocks (or sectors) of memory cell array 110 and selects one of the word lines of the selected memory block under the control of control logic 150. Decoding circuit 120 provides a word line voltage generated from voltage generating circuit 160 to the selected word line and unselected word lines under the control of control logic 150.

Read/write circuit 130 is typically configured with a plurality of page buffers (not shown) corresponding to columns (or bit lines) or column pairs (or bit line pairs). Read/write circuit 130 is controlled by control logic 150 and operates as a sense amplifier or a writing driver according to the operation mode. For example, read/write circuit 130 can operate as the writing driver for driving bit lines according to data to be stored in memory cell array 110 during the programming operation. Read/write circuit 130 receives data to be programmed from the buffer to memory cell array 110 and drives the bit lines according to the received data. The programming operation performed by read/write circuit 130 can be applied to first and second regions 111 and 112 of memory cell array 110, and the main region and spare region of each of first and second regions 111 and 112.

In the read operation, read/write circuit 130 operates as the sense amplifier for reading data that has been programmed in memory cell array 110. The read operation performed in read/write circuit 130 can be applied to first and second regions 111 and 112 of memory cell array 110, and the main region and spare region of each of first and second regions 111 and 112. For example, read/write circuit 130 read main data and additional information such as an ECC data corresponding to the main data and an erasing/programming cycle. The main data and the additional information such as the ECC data and the erasing/programming cycles, which are read by read/write circuit 130, are output to memory controller 200 (or the host) through a buffer (not shown).

Moreover, read/write circuit 130 can perform the read retry operation until accurate data value is read without a read error under the control of control logic 150. In the read retry operation, multiple read operations can be performed using a plurality of variable read voltages generated from the variable read voltage generating unit 170. After the read retry operation is completed, read/write circuit 130 programs read retry information in second region 112 of memory cell array 110 under the control of control logic 150. The read retry information is provided to memory controller 200 under the control of control logic 150.

Memory controller 200 stores read retry information provided from control logic 150 in data storage region 250, and controls the operation of flash memory 100 so that an erase refresh operation is performed for a block where read retry has been performed. Moreover, when controlling the erase refresh operation, memory controller 200 can consider the erasing/programming cycle information of a memory block having a read error, in addition to the read retry information.

Memory controller 200 comprises a host interface (HI) 210, a flash interface (FI) 220, a central processing unit (CPU) 230, an ECC circuit 240, and a buffer 250.

CPU 230 controls the overall operation of memory controller 200. In various alternative embodiments, memory controller 200 can comprise more than one CPU 230. Where memory controller 200 comprises a single CPU 230, it can be referred to as a single core processor. Otherwise, where memory controller 200 comprises more than one CPUs 230, it can be referred to as a multi-core processor. Host interface 210 exchanges commands, addresses, and data with the host under the control of CPU 230. In various embodiments, host interface 210 can support any of several interfaces such as universal serial bus (USB), multi media card (MMC), PCI-express (PCI-E), advanced technology attachment (ATA), serial AT attachment (SATA), parallel AT attachment (PATA), small computer system interface (SCSI), serial attached SCSI (SAS), enhanced small disk interface (ESDI) and integrated drive electronics (IDE). Flash interface 220 exchanges data between a buffer RAM 250 and flash memory 100 under the control of CPU 230.

ECC circuit 240 generates ECC data based on data transmitted to flash memory 100 for a programming operation. The ECC data generated by ECC circuit 240 is transmitted to flash memory 100 and stored in the spare region of a page where a main data is stored. ECC circuit 240 detects errors in data read from flash memory 100. Where a correctable error is detected in data that has been read from flash memory 100, ECC circuit 240 can autonomously corrects the detected error. On the other hand, where an uncorrectable error is detected in the data that has been read from flash memory 100, ECC circuit 240 generates read error information.

The read error information generated by ECC circuit 240 can be provided to control logic 150 of flash memory 100 through flash interface 220. Control logic 150 controls read/ write circuit 130, the variable read voltage generating unit 170 of voltage generating circuit 160, and decoding circuit 120 so that a read retry operation is performed in a page where a read operation has been performed, on the basis of the read error information. Control logic 150 updates the read retry information stored in a certain data storage region, such as second region 112 or a register of memory cell array 110, each time read retry is performed. The updated read retry information can be provided to memory controller 200 and used to control the erase refresh operation.

Buffer RAM 250 in memory controller 200 temporarily stores data that is read from flash memory 100 or data that is provided from the host, and stores software or firmware such as the FTL. In addition, buffer RAM 250 can store the read retry information that is provided from flash memory 100. The read retry information can be stored in a data storage region such as a register, in addition to buffer RAM 250.

Flash memory 100 does not perform overwriting, and therefore its memory cells must be erased before new data can be stored therein. However, because data is stored in flash memory 100 in units of a page, but erased in units of a block, an erase-before-write operation may be inefficient from a performance standpoint. Because of this and other features of flash memory 100, memory controller 200 can include an FTL to allow efficient use of storage space while maintaining a straightforward addressing scheme.

The FTL maps logical addresses generated by the file system during the programming operation of flash memory 100, to erased physical addresses of flash memory 100. The address mapping operation of the FTL can be performed during the erase refresh operation as well as normal programming operations. For example, where the erase refresh operation is performed in flash memory 100, the FTL can perform address mapping for a free memory block to which data will be moved. In this case, a memory block to be erased by an error can be erased at an appropriate time by the FTL.

The FTL can use an address mapping table to allow fast address mapping. The address mapping table can be stored in a metadata type in second region 112 of flash memory 100. Address mapping information can be copied from second region 112 of flash memory 100 to buffer RAM 250 of memory controller 200 under the control of CPU 230 in a power-up operation. Due to the address mapping function of the FTL, the host can recognize flash memory 100 as a hard disk drive or SRAM, and can access flash memory 100 using the same addressing scheme as the hard disk drive.

In addition, the FTL can perform functions such as bad block management, data retention management due to the unpredicted shutoff of a power source and wear leveling. Through the wear leveling operation, the FTL can control for stress on specific memory blocks of flash memory 100. Stress on flash memory 100 is closely related with its lifetime. Among the significant factors contributing to stress are the number of erase times and the number of programming times. Erasing/programming cycle information for each memory block is stored in second region 112 of flash memory 100 and is provided to the FTL for wear leveling operations. The FTL can manage the erasing/programming cycle information provided from flash memory 100 similar to the address mapping table. The erasing/programming cycle information can be used to control both the erase refresh operation and the wear leveling operation.

Figure 6:
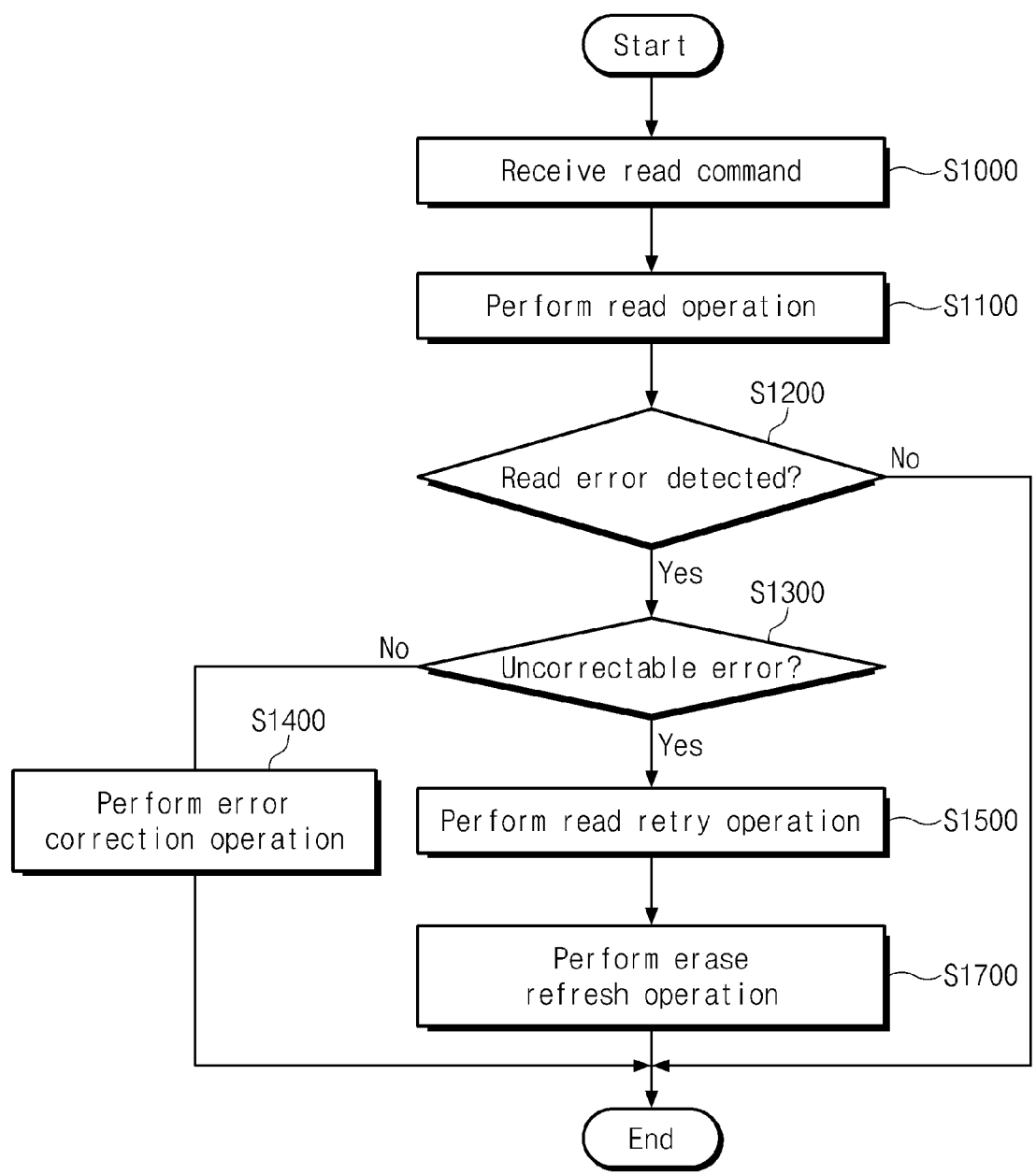
FIG. 6 is a flowchart illustrating a method of performing an erase refresh operation according to an embodiment of the inventive concept.

FIG. 6 is a flowchart illustrating a method of performing an erase refresh operation according to an embodiment of the inventive concept. In the description that follows, example method steps are denoted by parentheses.

Referring to FIG. 6, flash memory 100 receives a read command (S1000) and performs a read operation (S1100). Main data that is read through operation S1100 and ECC data corresponding to the main data are provided to memory controller 200. Memory controller 200 detects whether the main data contains any errors (S1200). Where no errors are detected (S1200=No), the method terminates. Otherwise (S1200=Yes), the method determines whether the detected errors can be corrected by ECC circuit 240 (S1300).

Where the detected errors are correctable (S1300=No), ECC circuit 240 autonomously corrects the errors (S1400). Otherwise, where the errors are uncorrectable (S1300=Yes), memory controller 200 controls flash memory 100 to perform a read retry operation (S1500). In the read retry operation, a read operation is repeatedly performed until accurate data is read while increasing/decreasing a voltage by a certain voltage increase increment ($\Delta V$) from a start voltage VRS. After the read retry operation, read retry information is stored and updated.

After the accurate data value is read through the read retry operation, flash memory 100 performs the erase refresh operation under the control of memory controller 200 (S1700). In the erase refresh operation, data that is accurately read through the read retry operation is moved to a free block of flash memory 100. A memory block in which the read retry operation has been performed can be subsequently erased.

In the embodiment of FIG. 6, the erase refresh operation is performed each time the read retry operation is performed. However, in alternative embodiments, the erase refresh operation can be performed under different circumstances. For example, the erase refresh operation can be performed each time the read retry operation is completed, or upon detection that a certain number of read refresh operations have been performed.

Figure 7:
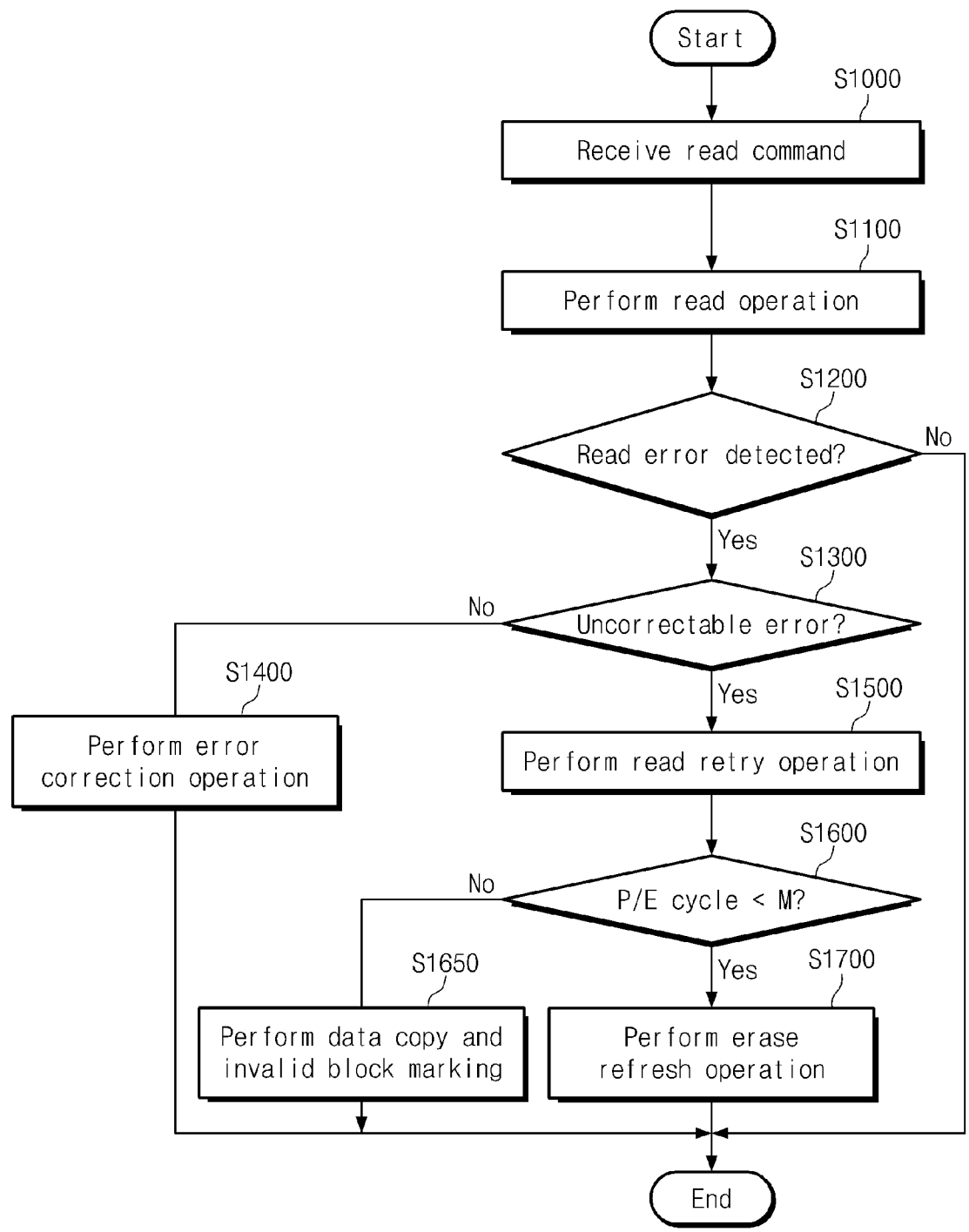
FIG. 7 is a flowchart illustrating a method of performing an erase refresh operation according to another embodiment of the inventive concept.

FIG. 7 is a flowchart illustrating a method of performing an erase refresh operation according to another embodiment of the inventive concept. The method of FIG. 7 is similar to the method of FIG. 6, except that the method of FIG. 7 further comprises operations S1600 and S1650. Accordingly, to avoid redundancy, a further description will not be provided for the operations already described with reference to FIG. 6.

Referring to FIG. 7, after an accurate data value is read through the read retry operation of operation S1500, memory controller 200 determines whether the number of erasing/programming cycles of a memory block where the read retry operation has been performed and/or the erasing/programming cycle of a target memory block to which data is moved through the erase refresh operation are less than a predetermined reference value "M" (S1600). In operation S1600, reference value "M" can be defined on the basis of the reliability of data and the expected life of a corresponding memory block. It can also be determined through experiment. Where the number of erasing/programming cycles of a memory block is less than reference value "M", the data reliability of the memory block is deemed to be high and the remaining life of the memory block is deemed to be sufficiently long. Furthermore, where the number of erasing/programming cycles of a memory block is greater than or equal to reference value "M", the data reliability of a corresponding memory block is deemed to be low and the remaining life of a corresponding memory is considered to be short.

Where number of erasing/programming cycles of the memory block is less than reference value "M" (S1600=Yes), flash memory 100 performs the erase refresh operation under the control of memory controller 200 (S1700). In the erase refresh operation, data that is accurately read through the read retry operation is moved to the free block of flash memory 100. Thereafter, the memory block in which the read retry operation has been performed is erased.

Where the number of erasing/programming cycles of the memory block is not less than reference value "M" (S1600=No), data that is accurately read through the read retry operation is moved to the free block of flash memory 100 and the memory block in which the read retry operation has been performed is marked as an invalid block or a bad block (S1650).

Figure 8:
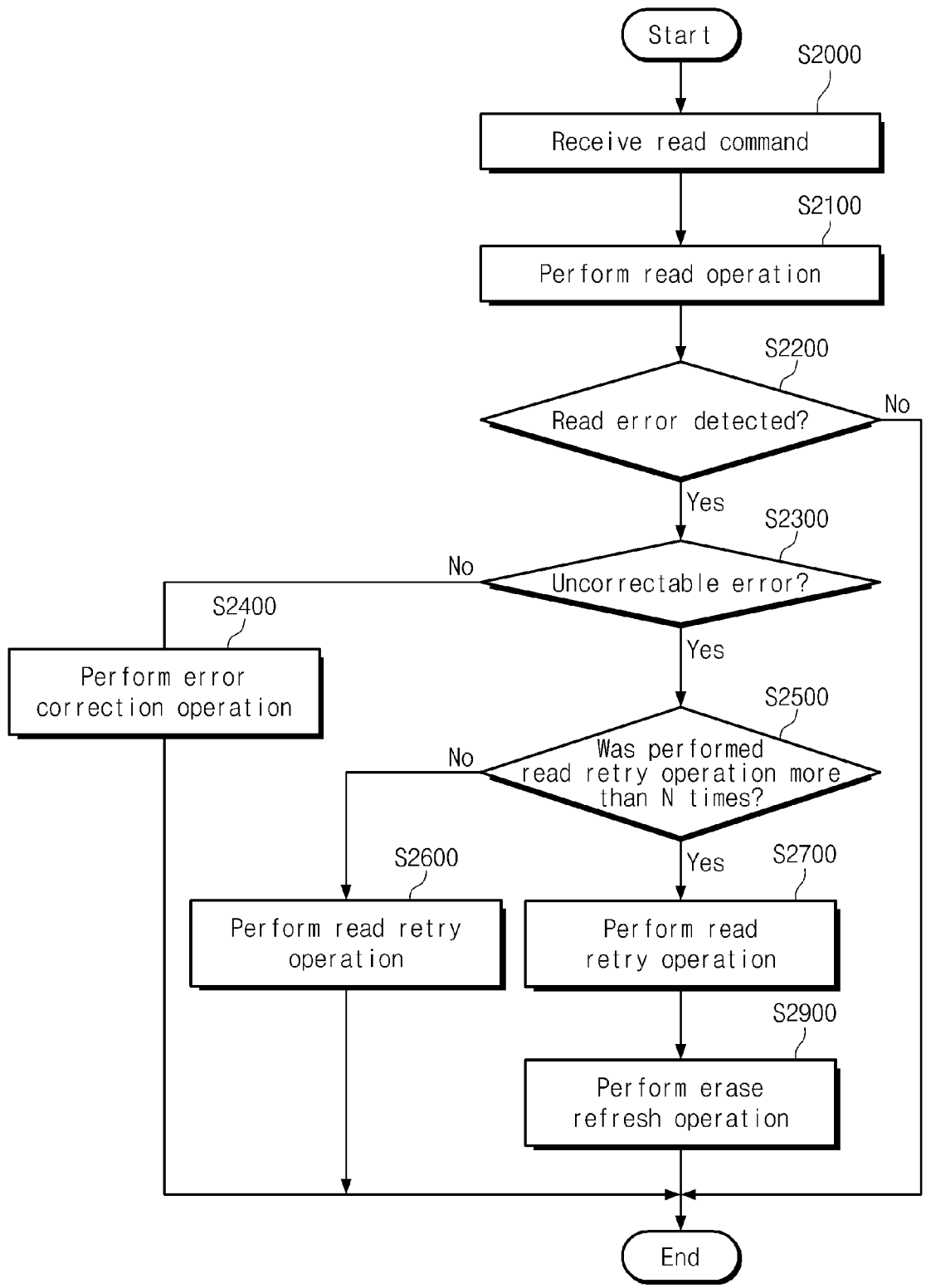
FIG. 8 is a flowchart illustrating a method of performing an erase refresh operation according to another embodiment of the inventive concept.

FIG. 8 is a flowchart illustrating a method of performing an erase refresh operation according to another embodiment of the inventive concept.

Referring to FIG. 8, flash memory 100 receives a read command (S2000) and performs a read operation (S2100). Main data that is read through operation S2100 and ECC data corresponding to the main data are provided to memory controller 200. Memory controller 200 operates ECC circuit 240 to detect whether the main data contains any errors (S2200). Where no errors are detected (S2200=No), the method terminates. Otherwise (S2200=Yes), the method determines whether the detected errors can be corrected by ECC circuit 240 (S2300).

Where the detected errors are correctable (S2300=No), ECC circuit 240 autonomously corrects the errors (S2400). Otherwise, where the errors are uncorrectable (S2300=Yes), memory controller 200 determines whether the read retry operation has been performed more than "N" times on the memory block from which data is being read (S2500).

Where the read retry operation has not been performed more than "N" times (S2500=No), the read retry operation is performed on the memory block (S2600) and the method terminates. Where the read retry operation has been performed more than "N" times on the memory block (S2500=Yes), the read retry operation is performed on the memory block (2700), and the erase refresh operation is performed with data that is accurately read through the read retry operation (S2900).

In the embodiment of FIG. 8, the erase refresh operation is performed on a memory block where a read retry operation has been performed more than "N" times. In general, a memory block where a read retry operation is performed more than "N" times may have a higher frequency of access compared with other memory blocks. Accordingly, by performing the erases refresh operation on such memory blocks, the reliability of frequently read data can be improved.

Figure 9:
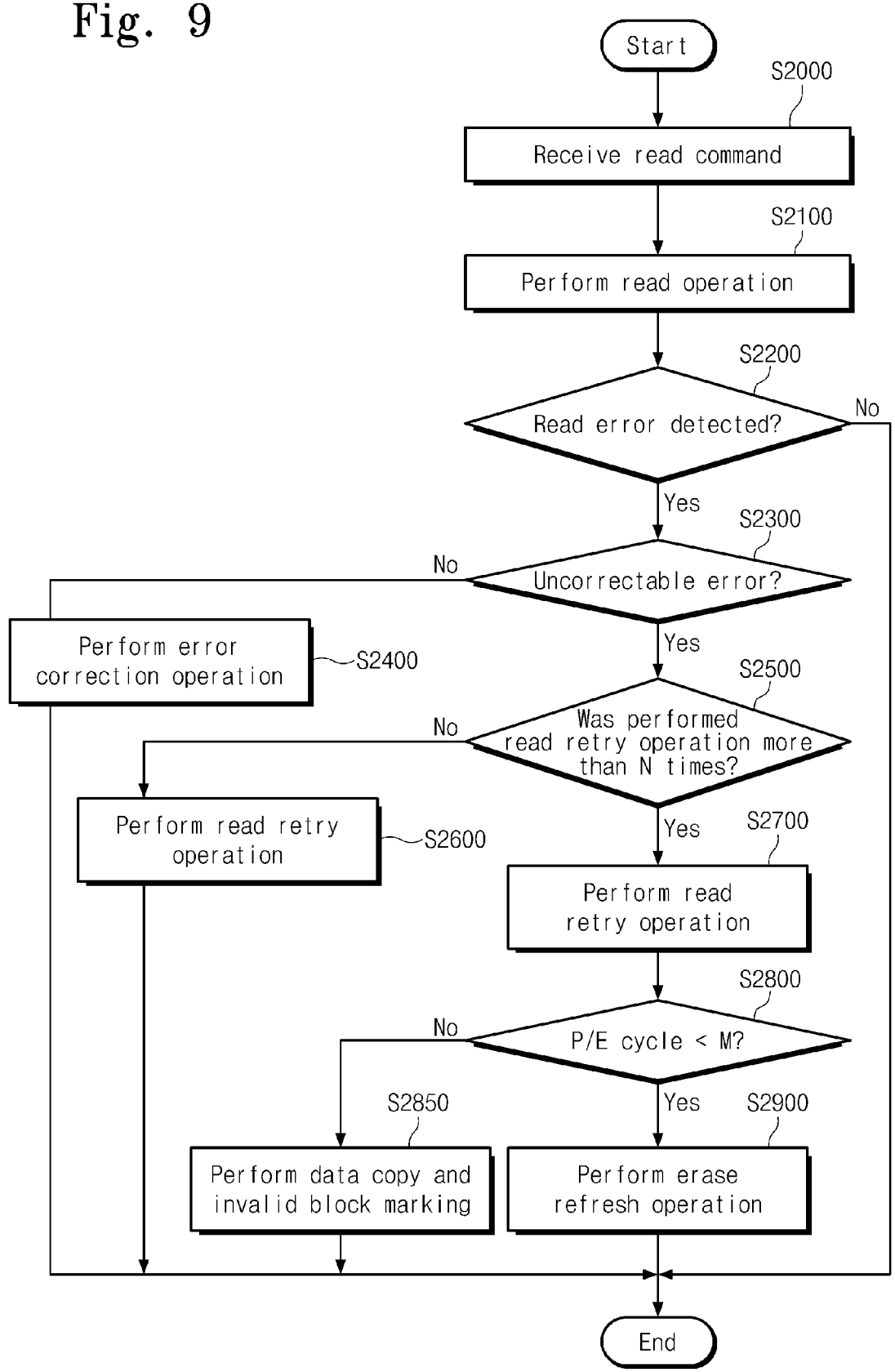
FIG. 9 is a flowchart illustrating a method of performing an erase refresh operation according to another embodiment of the inventive concept.

FIG. 9 is a flowchart illustrating a method of performing an erase refresh operation according to another embodiment of the inventive concept. The method of FIG. 9 is similar to the method of FIG. 8, except that the method of FIG. 9 further comprises operations S2800 and S2850. Accordingly, to avoid redundancy, a further description will not be provided for the operations already described with reference to FIG. 8.

Referring to FIG. 9, where the result of operation S2500 indicates that the read retry operation has been performed more than "N" times in the memory block (S2500=Yes), the read retry operation is performed on the memory block (S2700). Subsequently, memory controller 200 determines whether the number of erasing/programming cycles of the memory block where the read retry operation has been performed and/or the number of erasing/programming cycles of a target memory block to which data is moved through the erase refresh operation are less than a predetermined reference value "M" (S2800).

Where the number of erasing/programming cycles of the memory block is less than reference value "M" (S2800=Yes), the erase refresh operation is performed to move data that is accurately read through the read retry operation in operation S2700 to the free block of flash memory 100 (S2900). In addition, the memory block in which the read retry operation has been performed is erased.

Where the number of erasing/programming cycles of the memory block is equal to or greater than reference value "M" (S2800=No), data that is accurately read through the read retry operation is moved to the free block of flash memory 100, and the memory block in which the read retry operation has been performed is marked as an invalid block or a bad block (S2850).

Figure 10:
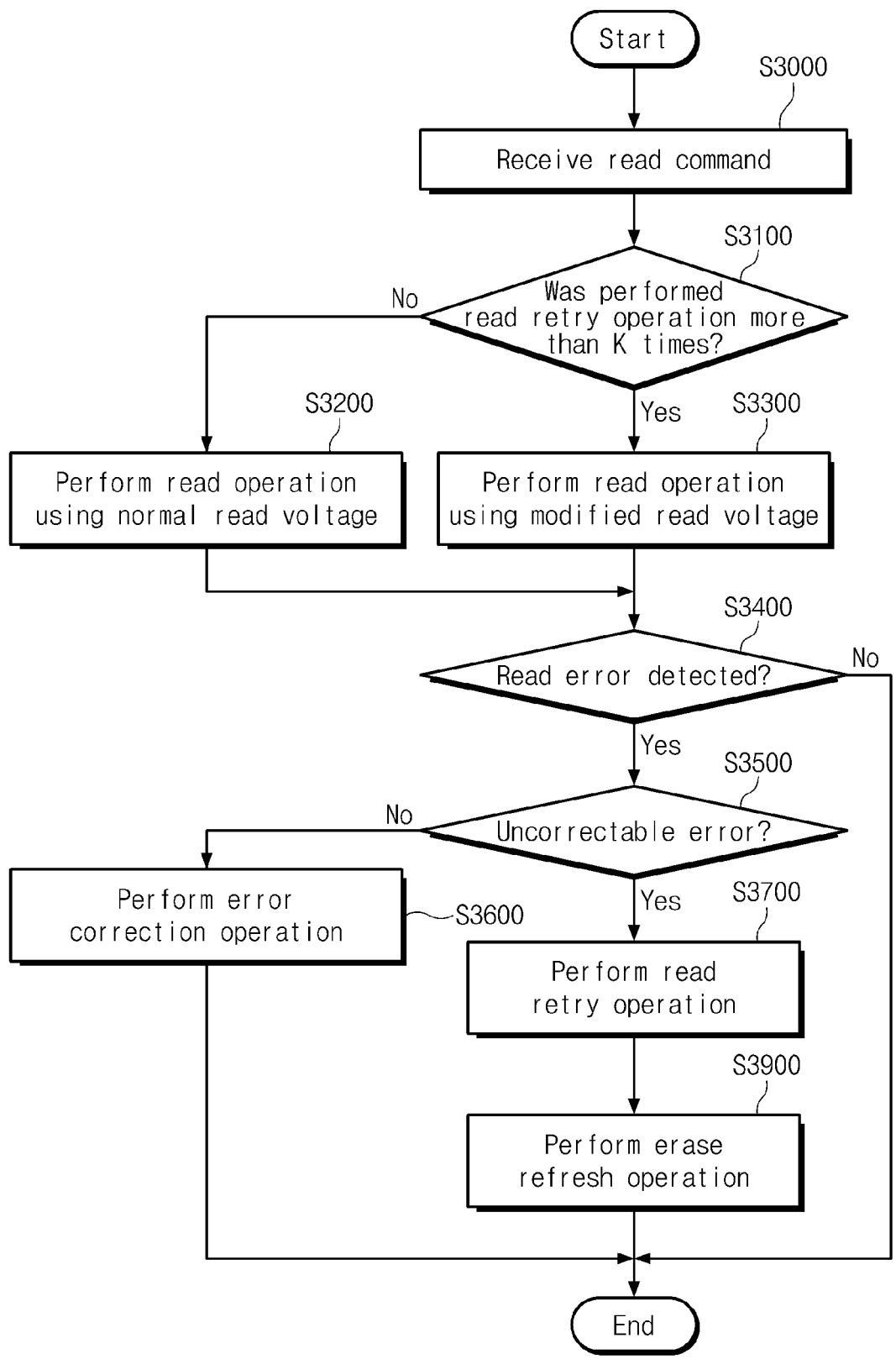
FIG. 10 is a flowchart illustrating a method of performing an erase refresh operation according to another embodiment of the inventive concept.

FIG. 10 is a flowchart illustrating a method of performing an erase refresh operation according to another embodiment of the inventive concept.

Referring to FIG. 10, flash memory 100 receives a read command (S3000) and determines whether a read retry operation has been performed more than a predetermined number of times "K" (S3100). The number "K" can be set to various different values depending on the characteristics of flash memory 100. Where the read retry operation has not been previously performed more than "K" times (S3100=No), a read operation is performed with a normal read voltage (S3200). Otherwise (S3100=Yes), the read operation is performed with a variable read voltage that is used to read an accurate value through a previously-performed read retry operation (S3300). The level of the previously-applied variable read voltage can be determined from read retry information stored and managed in flash memory 100 and/or memory controller 200.

Main data that is read in operation S3200 or S3300 and ECC data corresponding to the main data are provided to memory controller 200, and memory controller 200 operates ECC circuit 240 to detect whether an error exists in the main data (S3400). Where no error is detected in the main data (S3400=No), the method terminates. Otherwise (S3400=Yes), memory controller determines whether the detected errors can be corrected by ECC circuit 240 (S3500).

Where the errors can be corrected by ECC unit 240 (S3500=No), ECC circuit 240 autonomously corrects the errors (S3600). Otherwise (S3500=Yes), memory controller 200 controls flash memory 100 to perform a read retry operation (S3700). In the read retry operation, a read operation is repeatedly performed until accurate data is read while increasing/decreasing a voltage by a certain voltage increase increment ($\Delta V$) from a certain start voltage VRS.

After the accurate data value is read through the read retry operation, flash memory 100 performs the erase refresh operation under the control of memory controller 200 (S3900). In the erase refresh operation, the data that is accurately read through the read retry operation is moved to the free block of flash memory 100. A memory block in which the read retry operation has been performed is erased.

The method of FIG. 10 performs the read operation with the variable read voltage that is used to read accurate data through a previously-performed read retry operation. In the example of FIG. 10, accurate data values can be read even while minimizing the repetition of read retry operations.

Figure 11:
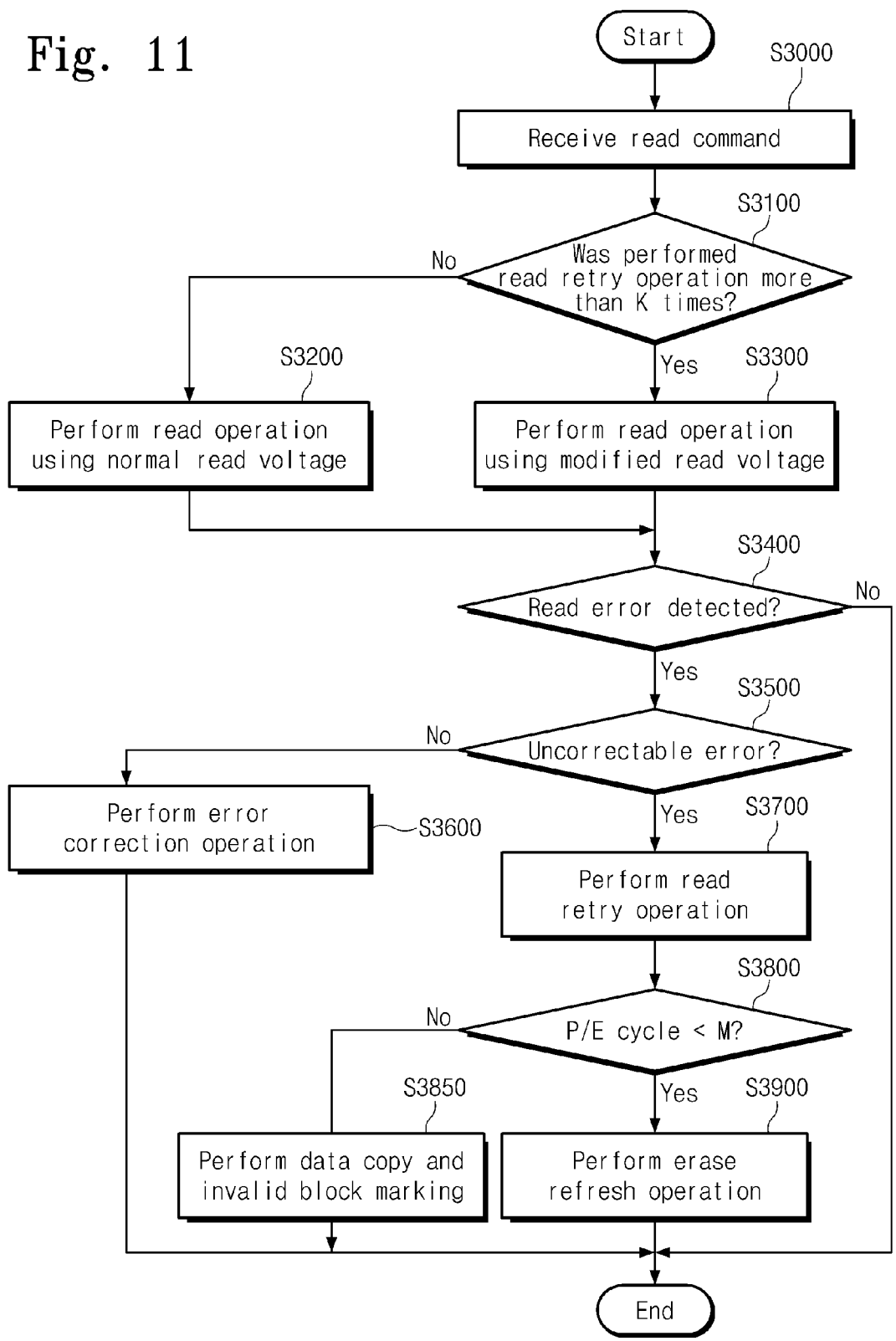
FIG. 11 is a flowchart illustrating a method of performing an erase refresh operation according to another embodiment of the inventive concept.

FIG. 11 is a flowchart illustrating a method of performing an erase refresh operation according to another embodiment of the inventive concept. The method of FIG. 11 is similar to the method of FIG. 10, except that the method of FIG. 11 further comprises operations S3800 and S3850. Accordingly, to avoid redundancy, a further description will not be provided for the operations already described with reference to FIG. 10.

Referring to FIG. 11, after the read retry operation is performed in operation S3700, memory controller 200 determines whether the number of erasing/programming cycles of a memory block where the read retry operation has been performed and/or the number of erasing/programming cycle of a memory block to which data is moved through the erase refresh operation are less than a predetermined reference value "M" (S3800).

Where the number of erasing/programming cycles of the memory block(s) is less than predetermined reference value "M" (S3800=Yes), the erase refresh operation is performed to move data that has been accurately read through the read retry operation in operation S3700 to the free block of flash memory 100 (S3900). In addition, the memory block in which the read retry operation has been performed is erased.

Where the number of erasing/programming cycles of the memory block(s) is not less than reference value "M" (S3800=No), data that is accurately read through the read retry operation is moved to the free block of flash memory 100 and the memory block in which the read retry operation has been performed is marked as an invalid block or a bad block (S3850).

Figure 12:
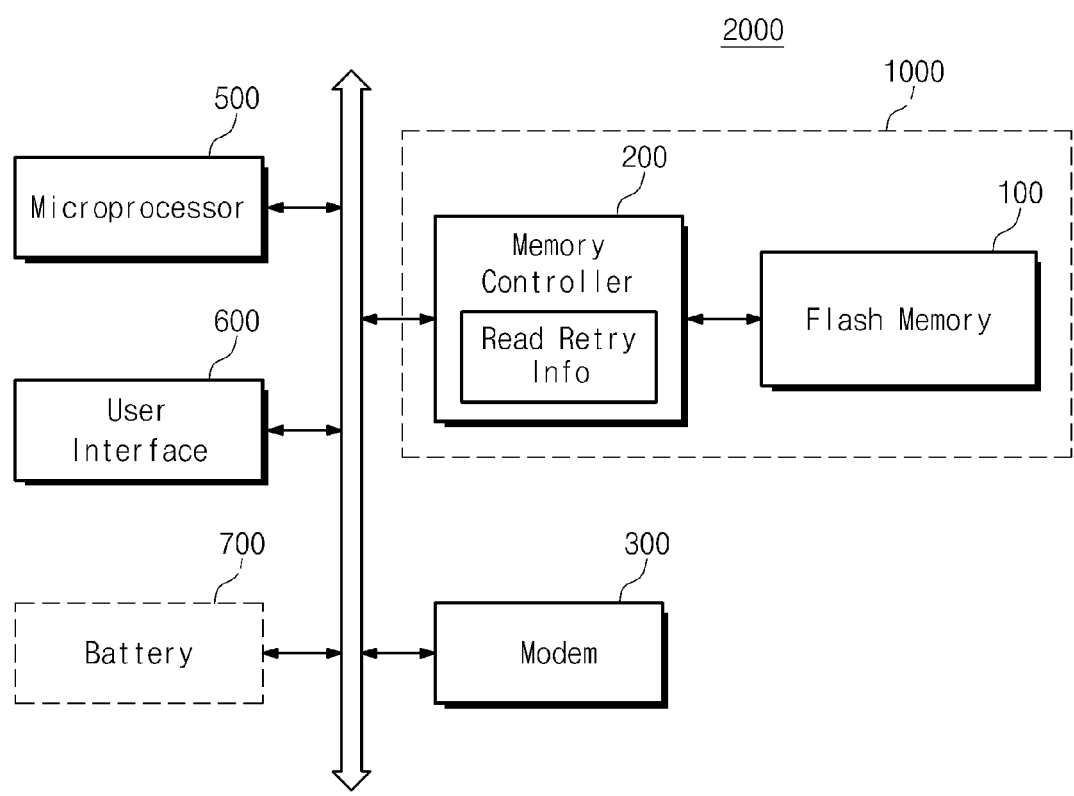
FIG. 12 is a block diagram of a computing system incorporating the memory system of FIG. 1.

FIG. 12 is a block diagram of a computing system 2000 incorporating memory system 1000 of FIG. 1 according to an embodiment of the inventive concept.

Memory system 1000 of FIG. 12 is configured with the substantially same elements as those of FIGS. 1 and 5. Accordingly, further description of these elements will be omitted to avoid redundancy.

In certain embodiments, memory system 1000 of FIG. 12 can be implemented as a memory card, a memory card system, or a solid state drive (SSD). In these and other embodiments, memory controller 200 can communicate with external devices such as a host through any one of various interface protocols such as USB, MMC, PCI-E, ATA, SATA, PATA, SCSI, SAS, ESDI, and IDE.

Flash memory 100 comprises a nonvolatile memory device that can retain stored data even when disconnected from power. Flash memory 100 can be used to store code and various forms of data that should be retained even in the presence of a power outage. Flash memory 100 can be employed in mobile devices such as cellular phones, personal digital assistants (PDAs), digital cameras, portable game consoles and MP3 players, and a number of home applications such as high definition televisions (HDTVs), digital video disks (DVDs), routers and global positioning systems (GPSs).

In certain embodiments, flash memory 100 performs a read retry operation for a memory block that detected to have uncorrectable error occurs during an ECC operation within a read operation. Read retry information associated with the read retry operation is stored from flash memory 100 to memory controller 200. Flash memory 100 performs erase refresh operations for memory blocks where a read retry operation has been performed at least one time, under the control of memory controller 200. The erase refresh operation allows flash memory 100 avoid further read retry operations, which can improve its read performance. Moreover, the erase refresh operation can efficiently correct and prevent the read errors in flash memory 100 and suppress the generation of bad blocks.

Referring to FIG. 12, computing system 2000 comprises a flash memory 100 electrically connected to a bus, a memory controller 200, a modem 300 such as a baseband chipset, a microprocessor 500, and a user interface 600. Where computing system 2000 is a mobile device, a battery 700 for supplying the operation voltage of the computing system 2000 may be additionally provided. Although not shown, computing system 2000 can further include an application chipset, a camera image processor (CIS), and a mobile DRAM. In certain embodiments, memory controller 200 and flash memory 100 are implemented as a memory card, a memory card system, or an SSD.

The above-described flash memory device and/or the memory controller can be mounted with various types of packages. For example, in certain embodiments, the flash memory device and/or the memory controller can be mounted with packages with one or more of the following configurations: package on package (PoP), ball grid array (BGA), chip scale packages (CSPs), plastic leaded chip carrier (PLCC), plastic dual in-line package (PDIP), die in waffle pack (DIWP), die in wafer form (DIWF), chip on board (COB), ceramic dual in-line package (CERDIP), plastic metric quad flat pack (MQFP), thin quad flat pack (TQFP), small outline package (SOP), shrink small outline package (SSOP), thin small outline package (TSOP), thin quad flat pack (TQFP), system in package (SIP), multi chip package (MCP), wafer level stack package (WLSP), die in wafer form (DIWF), die on waffle package (DOWP), wafer-level fabricated package (WFP) and wafer-level processed stack package (WSP).

In certain embodiments, the memory cells of flash memory 100 can be implemented with various cell structures having a charge trapping layer. For instance, flash memory 100 can be implemented with a charge trap flash structure using a charge trapping layer, a stack flash structure where arrays are stacked in multi layers, and a flash structure having no source-drain and a pin-type flash structure.

In certain embodiments described above, a memory system corrects and prevents read errors, and suppresses the generation of bad blocks, which can improve the reliability of stored data. Moreover, since read retry operations that may decrease read speed and read performance are omitted, the memory system can enhance the read speed and read performance of the flash memory.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A flash memory system, comprising:
   a flash memory comprising a plurality of memory blocks; and
   a memory controller that performs multiple successive read retry operations on a memory block in which an uncorrectable read error has been detected in a read operation using a normal read voltage, until a correctable data value is read, and thereafter controls the flash memory to perform an erase refresh operation on the memory block;
   wherein the memory controller performs the read retry operation using a varied read voltage that is produced by incrementing or decrementing the normal read voltage in each of the successive read retry operations according to whether the normal read voltage is designated for reading a first data state or a second data state.

2. The flash memory system of claim 1, wherein the flash memory stores and updates read retry information associated with each of the successive read retry operations.

3. The flash memory system of claim 2, wherein the read retry information comprises at least one of (a) a number read retry operations that have been performed on the memory block, (b) an address of the memory block, and (c) a value of the varied read voltage used to read correctable data in the read retry operations.

4. The flash memory system of claim 2, wherein the memory controller controls the erase refresh operation based on the read retry information.

5. The flash memory system of claim 1, wherein the read retry operations are performed repeatedly until a correctable data value is read.

6. The flash memory system of claim 1, wherein the first data state is an erase state of memory cells in the flash memory device.

7. The flash memory system of claim 1, wherein the second data state is a highest program state of memory cells in the flash memory device.

8. A method of operating a memory device comprising a plurality of memory blocks, the method comprising:
performing multiple successive read retry operations on a memory block in which an uncorrectable read error has been detected in a read operation using a normal read voltage, until a correctable data value is read from the memory block; and
performing an erase refresh operation on the memory block after at least one of the read retry operations has been performed, in response to read retry information associated with the at least one read retry operation
wherein the memory controller performs the read retry operations using a varied read voltage that is produced by incrementing or decrementing the normal read voltage in each of the successive read retry operations according to whether the normal read voltage is designated for reading a first data state or a second data state.

9. The method of claim 8, wherein the read retry operations are performed repeatedly until a correctable data value is read.

10. The method of claim 8, wherein the read retry information comprises at least one of (a) a number read retry operations that have been performed on the memory block, (b) an address of the memory block, and (c) a value of the varied read voltage which is used to read correctable data in the read retry operation.

11. The method of claim 8, wherein the first data state is an erase state of memory cells in the memory device.

12. The method of claim 8, wherein the second data state is a highest program state of memory cells in the memory device.

13. A method of operating a nonvolatile memory device comprising a plurality of memory blocks, the method comprising:
reading data from a selected memory block in a read operation using a normal read voltage;
detecting whether an uncorrectable error exists in the data;
upon detecting the uncorrectable error, performing a plurality of read retry operations on the selected memory block using a varied read voltage until a correctable error exists in the data that is read; and
moving the data that has been read to a free memory block and erasing the selected memory block;
wherein the varied read voltage is incremented or decremented in each successive read retry operation according to whether the normal read voltage is designated for reading a first data state or a second data state.

14. The method of claim 13, further comprising:
marking the selected memory block as an invalid block or a bad block upon detecting that a number of erasing/programming cycles of the selected memory block is greater than or equal to a predetermined reference value.

15. The method of claim 13, wherein reading the data from the selected memory block comprises:
determining whether a prior read retry operation has correctable read data from the selected memory block;
upon determining that a prior read retry operation has correctable read data from the selected memory block, applying a varied read voltage from the prior read retry operation to the selected memory block; and
upon determining that no prior read retry operation has correctable read data from the selected memory block, applying the normal read voltage to the selected memory block.

16. The method of claim 13, wherein the first data state is an erase state of memory cells in the nonvolatile memory device.

17. The method of claim 13, wherein the second data state is a highest program state of memory cells in the nonvolatile memory device.

* * * * *